United States Patent Office 3,119,784
Patented Jan. 28, 1964

3,119,784
PROPYLENE RESIN STABILIZED WITH A MIXTURE OF A PARA-TERTIARYALKYLPHENOL-FORMALDEHYDE RESIN AND AN AMINODITHIOFORMATE
Bernard O. Baum, Plainfield, N.J., assignor to Union Carbide Corporation, a corporation of New York
No Drawing. Filed Jan. 5, 1960, Ser. No. 493.
10 Claims. (Cl. 260—43)

This invention relates to improved propylene polymer compositions. More particularly, it relates to polypropylene having greatly increased resistance to light and thermal degradation and being substantially light in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their high stiffness moduli.

Unfortunately, propylene polymers are subject to severe deterioration from the oxidative action of air at elevated temperatures. For example, fibers that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

While it is known that small amounts of some anti-oxidants, for example, 4,4'-thio-bis(6-tertiarybutyl-3-methylphenol); 2,2-bis(4-hydroxyphenyl)propane; diphenylamine; etc., can be added to polypropylenes to prevent degradative effects during the short period the polymer is heated for melt spinning to produce fibers, it is not possible by the use of these conventional and well known anti-oxidants to prevent the oxidative degradation that occurs over prolonged exposure to air at temperatures below the melting temperature of polypropylene. For example, the inclusion in a polypropylene fiber of two percent by weight of 4,4'-thio-bis(6-tertiarybutyl-3-methylphenol), which is known to be one of the most effective anti-oxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiary alkylphenolformaldehyde resins. The so stabilized polypropylene compositions are more resistant to air oxidation and thermal degradation during compounding and are able to endure the forming temperatures with no significant reduction of strength or electrical properties. However, relatively large concentrations, i.e., 0.1 to 1 percent are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide propylene resin compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a p-tertiary-alkylphenol-formaldehyde resin, and a salt of an N-substituted aminodithioformic acid.

The low molecular weight para-tertiaryalkylphenol-formaldehyde resins suitable for use in this invention are the A-stage resins produced by the reaction of para-tertiaryalkyl-phenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiary-alkylphenols with formaldehyde in the presence of a suitable catalyst, such as oxalic acid, by procedures which are well known in the plastics art. Among the paratertiaryalkylpenols which can be used in producing the suitable A-stage resins by reaction with formaldehyde are the para-tertiaryalkylphenols, in which the alkyl group contains from 4 to about 20 carbon atoms or more, preferably from 4 to about 10 carbon atoms, such as para-tertiarybutylphenol, para-tertiaryamylphenol, para-tertiaryheptylphenol, para-tertiarynonylphenol and the like.

Illustrative of the A-stage resins that can be used to control the oxidative degradation of polypropylene are para-tertiarybutylphenol-formaldehyde resin, para-tertiaryamylphenol-formaldehyde resin, para-tertiarynonylphenolformaldehyde resin, para-tertiarydodecylphenol-formaldehyde resin and the like. The resins can be prepared from the pure para-phenol or from a mixture of para phenol with the ortho and/or meta isomers.

However, the effectiveness of the A-stage resins as antioxidants is dependent in very large measure upon the para-tertiaryalkylphenol content in the resin. Thus, even though an A-stage resin formed from a mixture of isomeric alkylphenols having a major proportion of the para isomer is an effective constituent of the present compositions, larger quantities of the A-stage resin are needed in order to have a sufficient concentration of the para-tertiaryalkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The aminodithioformate compounds suitable for use in the compositions of the present invention are those which correspond to the general formula

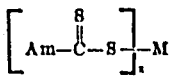

wherein M is a cation selected from the group consisting of $Na^+$, $Zn^{++}$, $Sc^{++++}$, $NH_4^+$, $Te^{++++}$ and

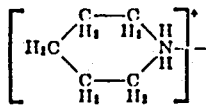

$x$ is an integer having a value equal to the positive valence of M; and Am is an amino radical selected from the group consisting of (1) a dialkyl amino radical having the formula

wherein R and R' are each an alkyl group containing from 1 to 6 carbon atoms, and (2) a polymethylene amino radical having the formula

wherein $n$ has a value of from 4 to 6 inclusive.

Preferably the aminodithioformate compound is the zinc salt in which the amino group is a dialkyl amino radical, particularly the dibutyl amino radical.

Illustrative of the aminodithioformate compounds suitable for use in the present invention are sodium diethylaminodithioformate, selenium dimethylaminodithioformate, ammonium diethylaminodithioformate, ammonium diisobutylaminodithioformate, zinc diethylaminodithioformate, zinc dimethylaminodithioformate, zinc dibutylaminodithioformate, piperidinium diamylaminodithioformate, selenium piperidyldithioformate, piperidinium piperidyldithioformate, tellurium dimethylaminodithioformate, and the like.

The aminodithioformate salts are for the most part well known chemical compounds and are commercially available. Particularly is this true of the zinc dialkylaminodithioformates. The ammonium salts, for instance, can be readily prepared by the reaction of ammonia and primary or secondary amines with carbon disulfide. The sodium salts are obtained directly by using sodium hydroxide in the reaction between the amine and carbon disulfide.

Propylene resin compositions having improved heat and light stability and greatly improved color are, according to this invention, those which contain from about 0.05 to about 5.0 percent by weight or greater of the A-stage para-tertiaryalkylphenol-formaldehyde resin hereinbefore described based on the weight of the polypropylene present, and in combination therewith an N-substituted aminodithioformic acid salt in an amount of from about 10% to 600%, preferably 20% to 200%, by weight based on the weight of the phenolic resin stabilizer. The term "propylene resin" is intended to include propylene homopolymers and copolymers of propylene and one or more ethylenically unsaturated monomers in which the content of propylene polymerized therein is 50 percent or greater and preferably at least 80 percent by weight.

Whereas the proportion of A-stage phenolic resin to propylene polymer and the proportion of aminodithioformate decolorizer to A-stage phenolic resin as set forth above are satisfactory to produce a stable product having a light color suitable for all but the most unusual use requirements, it is to be understood that greater or lesser quantities of either the phenolic resin or the decolorizer can be utilized and still be within the spirit and proper scope of the invention. In a practical sense, however, greater latitude can be exercised with respect to the phenolic resin than with the aminodithioformate constituent since ratios of aminodithioformate to phenolic resin of greater than 6:1 on a weight basis do not to any large degree improve the color of the final composition.

The para-tertiaryalkylphenol-formaldehyde resin-aminodithioformate stabilizer composition can be incorporated into the polypropylene by any suitable means, for example, by fluxing the polypropylene with the stabilizer composition on heated rolls, by the use of Banbury mixers, or of heated extruders, and the like, or by the use of a solvent solution of the stabilizer.

The following examples will serve to further illustrate the present invention.

In the examples, at each occurrence the following definitions and characterizations apply:

*Yellowness index.*—The yellowness index reported is the quotient of the degree of yellowness divided by the degree of whiteness of any given polypropylene composition tested. Yellowness and whiteness are based on color reflectance measurements made on molded plaque samples by means of a spectrophotometer modified for reflectance measurements (Beckman Model "B" abridged). The reflectance over vitrolite, an arbitrarily chosen reflectance standard, was measured on the plaque samples at wave lengths of 550 mµ and 430 mµ. Whiteness is based on the percentage reflectance at 550 mµ and yellowness is based on the percentage reflectance at 430 mµ. The yellowness index is therefore equal to $$\frac{R_{550\ m\mu} - R_{430\ m\mu}}{R_{550\ m\mu}}$$

in which R is the percentage reflectance at the wave length indicated by the subscript. The smaller the quotient, the lighter the color of the composition.

*Polypropylene resin.*—The propylene homopolymer employed is a typical normally solid polypropylene having a melt index of 3.1 decigrams per minute, a density of 0.908 gram per milliliter at 23° C. and a tensile modulus of 138,000 pounds per square inch.

*MIDF (melt index depreciation factor).*—The ratio of melt index of polypropylene resin or resin composition after heating 15 min. at 288° C. compared to the initial melt index. The melt index determination was in accordance with ASTM test D–1238–52T.

*Thermal stability (induction period in hours in air at 150° C.).*—As a measure of the thermal stability, the composition tested was compression molded into 30 mil thick plaques which were then suspended in a 150° C. circulating air oven. Periodically the plaques were examined and subjected to a manually applied bending force. The plaques either sustained the applied force without discernible ill-effect or crumbled into small powdery fragments. The plaques did not exhibit any inbetween behavior. The time period during which the plaque could resist the applied force is called the induction period.

*Phenolic stabilizer.* — An A-stage para-tertiaryamylphenol-formaldehyde resin having a softening point at 185° F. prepared by the oxalic acid catalyzed condensation of paratertiaryamylphenol and formaldehyde under reflux conditions. The condensation product mass was then vacuum distilled to remove formed water, unreacted phenol and low molecular weight condensation products, and thereafter cooled and ground.

*Weathering Resistance (hours to embrittlement).* — This property is indicative of the resistance of the polypropylene resins or compositions to the effects of typical climatic conditions. The sample is subjected to an accelerated program of exposure to light and water in the apparatus and according to the standard procedure specified in ASTM test method D–822–57T.

EXAMPLES 1–8

The synergistic stabilizing action of an aminodithioformate and a phenolic resin stabilizer was demonstrated by preparing a series of polypropylene compositions, some of which contained both an aminodithioformate and a phenolic resin, and some of which contained only the aminodithioformate. The compositions were prepared by admixing the modifiers with the polypropylene immediately after the polypropylene had been fluxed and sheeted on a two-roll mill at 170° C. The modifiers were thoroughly blended with the fluxed polypropylene by successively end-passing the mixture through the mill nip ten times. For control, the same polypropylene was hot processed according to the same procedure, one portion receiving no modifiers, and two portions being admixed with the phenolic resin stabilizer in amounts of 0.5 percent by weight and 1.0 percent by weight respectively. A portion of all compositions so prepared was compression molded and subjected to weathering and thermal abuse in air at 150° C. The results are reported in Table I below.

EXAMPLE 9

Using the same procedure for combining ingredients as in Examples 1–8, a series of polypropylene compositions containing various amounts of zinc diethylaminodithioformate and/or phenolic resin stabilizer were prepared and tested for color and thermal stability as hereinbefore described. The results are shown in tabular form below.

*Table II*

| Phenolic stabilizer, conc. (wt. percent a) | Promotor | | | | | | |
|---|---|---|---|---|---|---|---|
| | None | | | Zinc diethylaminodithioformate | | | |
| | Color b | Stability at 150° C. | MIDF at 288° C. | Conc. (wt. percent a) | Color b | Stability at 150° C. | MIDF at 288° C. |
| ------ | 0.39 | 4 | 15 | ---- | ---- | ---- | ---- |
| ------ | ---- | ---- | ---- | 0.1 | ---- | 7 | 0.0 |
| ------ | ---- | ---- | ---- | 0.5 | 0.41 | 12 | 1.3 |
| ------ | ---- | ---- | ---- | 1.0 | ---- | 20 | 1.5 |
| 0.5 | 0.67 | 32 | 1.4 | 0.1 | 0.64 | 46 | 1.3 |
| 0.5 | ---- | ---- | ---- | 0.5 | 0.57 | 64 | 1.3 |
| 1.0 | 0.78 | 48 | 1.3 | ---- | ---- | ---- | ---- |
| 2.0 | 0.85 | 100 | 1.5 | ---- | ---- | ---- | ---- | a Based on the weight of polypropylene.
b Yellowness index.

It can be seen from the data in Table II that the phenolic resins, when used alone, stabilize polypropylene against air oxidation at 150° C., but cause pronounced yellowing, and that both the stabilizing action and yellowing become greater with increasing phenolic resin concentration. It is also apparent that the aminodithioformates when used alone, have only a small stabilizing effect on polypropylene in air at 150° C., and, if anything, a slight adverse effect on color.

*Table I*

| Composition | Weathering resistance (hrs. to embrittlement) | Thermal stability (Induction period at 150° C. in air, hrs.) |
|---|---|---|
| Unmodified polypropylene | 200 | 6 |
| Polypropylene plus 0.5% phenolic resin stabilizer | 500 | 32 |
| Polypropylene plus 1.0% phenolic resin stabilizer | 750–1,000 | 48 |

| Ex. | Polypropylene | Additives | | |
|---|---|---|---|---|
| 1 | Polypropylene | 0.5% zinc diethylaminodithioformate | 500 | 12 |
| | | 0.5% zinc diethylaminodithioformate plus 0.5% phenolic stabilizer | 1,750 | 64 |
| 2 | do | 0.5% zinc dibutylaminodithioformate | 500 | 12 |
| | | 0.5% zinc dibutylaminodithioformate plus 0.5% phenolic stabilizer | 1,750 | 64 |
| 3 | do | 0.5% dimethylaminodithioformate | 500 | |
| | | 0.5% dimethylaminodithioformate plus 0.5% phenolic stabilizer | 1,750 | 68 |
| 4 | do | 0.5% ammonium diethylaminodithioformate | 425 | 6 |
| | | 0.5% ammonium diethylaminodithioformate plus 0.5% phenolic stabilizer | 1,500 | 36 |
| 5 | do | 0.5% sodium diethylaminodithioformate | 350 | 6 |
| | | 0.5% sodium diethylaminodithioformate plus 0.5% phenolic stabilizer | 1,000 | 48 |
| 6 | do | 0.5% piperidinium piperidyldithioformate | 425 | 12 |
| | | 0.5% piperidinium piperidyldithioformate plus 0.5% phenolic stabilizer | 1,500 | 62 |
| 7 | do | 0.5% selenium dimethylaminodithioformate | | 12 |
| | | 0.5% selenium dimethylaminodithioformate plus 0.5% phenolic stabilizer | | 78 |
| 8 | do | 0.5% tellurium diethylaminodithioformate | | 10 |
| | | 0.5% tellurium diethylaminodithioformate plus 0.5% phenolic stabilizer | | 74 |

It is readily apparent from the data of Table I that each of the stabilizing modifiers used above improve the weathering resistance and the thermal stability, but that when the phenolic resin stabilizer and the aminodithioformate are used in combination, much greater stability is imparted to the composition than would result from merely adding the improvement credited to each.

EXAMPLE 10

The effect of concentration of additives in the polypropylene compositions of this invention were determined by preparing a series of compositions according to the procedure of Examples 1–8 containing various amounts of phenolic resin stabilizer and/or zinc dimethylaminodithioformate, and testing the compositions thus obtained for resistance toward embrittlement in air at 150° C. The formulations and results are set forth in Table III below.

Table III
EFFECT OF CONCENTRATION OF ADDITIVES

| Conc. of additives (wt. percent) | | Total (A+B) | Ratio B/A | Induction period (hrs.) in air at 150° C. |
|---|---|---|---|---|
| A Phenolic resin | B Zinc diethyl- amino- dithio- formate | | | |
| 0.0 | 0.0 | 0.0 | | 4 |
| 0.0 | 0.1 | 0.1 | | 7 |
| 0.0 | 0.5 | 0.5 | | 12 |
| 0.0 | 1.0 | 1.0 | | 20 |
| 0.1 | 0.0 | 0.1 | | 8 |
| 0.1 | 0.1 | 0.2 | 1.0 | 23 |
| 0.5 | 0.0 | 0.5 | | 32 |
| 0.5 | 0.1 | 0.6 | 0.2 | 46 |
| 0.5 | 0.5 | 1.0 | 1.0 | 64 |

The contribution of the aminodithioformate is surprising in that it does not, by itself, effectively stabilize polypropylene against embrittlement in air at 150° C., but it greatly improves the ability of the phenolic resin to do so.

EXAMPLE 11

A styrene-propylene copolymer having a melt index of about 0.03 and containing an interpolymerized styrene to propylene ratio of 18:82 was blended with 0.5 percent by weight of the para-tertiaryamylphenol-formaldehyde resin stabilizer of Examples 1–8. A portion of this blend was further blended with zinc diethylaminodithioformate in an amount of 0.5 percent by weight of the over-all composition. Each of the two compositions was compression molded and yellowness index determinations made. The yellowness index of the copolymer composition containing only the phenolic resin stabilizer was found to be 0.47. The yellowness index of the composition containing both the phenolic resin stabilizer and the zinc diethylaminodithioformate was found to be 0.31.

The polypropylene compositions of the present invention find particular utility, because of their resistance to oxidation degradation, as extruded or spun textile fibers and yarns. These compositions find additional utility in the form of films and sheets suitable for packaging, and in the form of a wide variety of extruded and molded articles.

The compositions can also include conventional additives such as colorants, lubricants, slip agents, plasticizers, fillers and the like, and can be admixed with other polymeric materials.

What is claimed is:

1. A propylene resin composition having improved stability toward heat and light induced molecular degradation which comprises a normally solid propylene polymer containing at least 50 percent by weight of propylene polymerized therein, a stabilizing amount of an A-stage para-tertiaryalkylphenol-formaldehyde resin in which the alkyl group of the para-tertiaryalkylphenol contains from 4 to 20 carbon atoms, and an aminodithioformate having the general formula

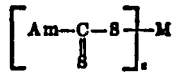

wherein M is a cation selected from the group consisting of Na+, Zn++, Se++++, Te++++, NH4+, and

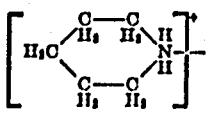

x is an integer having a value equal to the positive valence of M; and Am is an amino radical selected from the group consisting of (1) a dialkyl amino group having the general formula

wherein R and R' are each an alkyl group containing from 1 to 6 carbon atoms, and (2) a polymethylene amino radical having the formula

wherein n has a value of from 4 to 6 inclusive.

2. A stabilized propylene resin composition comprising a normally solid propylene polymer containing at least 50 percent by weight of propylene polymerized therein, an A-stage para-tertiaryalkylphenol-formaldehyde resin in which the alkyl group of the para-tertiaryalkylphenol contains from 4 to 20 carbon atoms, said A-stage resin being present in an amount of from about 0.05 to about 5.0 percent by weight based on the weight of the propylene polymer, and an aminodithioformate having the general formula

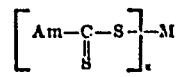

wherein M is a cation selected from the group consisting of Na+, Zn++, Se++++, Te++++, NH4+, and

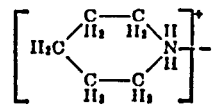

x is an integer having a value equal to the positive valence of M; and Am is an amino radical selected from the group consisting of (1) a dialkyl amino radical having the formula

wherein R and R' are each an alkyl group containing from 1 to 6 carbon atoms, and (2) a polymethylene amino radical having the formula

wherein n has a value of from 4 to 6 inclusive, said aminodithioformate being present in an amount of from about 10 percent to about 600 percent by weight based on the weight of the A-stage para-tertiaryalkylphenol-formaldehyde resin.

3. The composition of claim 2 wherein the para-tertiaryalkyl group of the A-stage para-tertiaryalkylphenol-formaldehyde resin contains from 4 to 10 carbon atoms.

4. The composition of claim 2 wherein the cation represented by M is Zn++ and the amino radical represented by Am is a dialkyl amino radical wherein each of the alkyl groups contains from 1 to 6 carbon atoms.

5. The composition of claim 4 wherein the amino radical represented by Am is a diisopropyl amino radical.

6. The composition of claim 4 wherein the amino radical represented by Am is a diethyl amino radical.

7. The composition of claim 2 wherein the propylene polymer is a normally solid propylene homopolymer.

8. The composition of claim 2 wherein the propylene polymer is a copolymer of propylene and styrene containing at least about 80 percent by weight propylene polymerized therein.

9. A stabilized polypropylene composition comprising a normally solid propylene homopolymer, an A-stage para-tertiaryamylphenol-formaldehyde resin in an amount of from about 0.05 to about 5.0 percent by weight based on the weight of the propylene homopolymer, and zinc diisopropylaminodithioformate in an amount of from about 10 percent to about 600 percent by weight based on the weight of the A-stage para-tertiaryalkylphenol-formaldehyde resin.

10. The composition of claim 9 wherein the zinc diisopropyldithioformate is present in an amount of from about 20 to about 200 percent by weight based on the weight of the para - tertiaryalkylphenol - formaldehyde resin.

References Cited in the file of this patent

UNITED STATES PATENTS

| | | |
|---|---|---|
| 2,163,637 | Thomas | June 27, 1939 |
| 2,240,582 | Sparks | May 6, 1941 |
| 2,789,962 | Groff et al. | Apr. 23, 1957 |
| 2,889,306 | Hawkins et al. | June 2, 1959 |
| 2,968,641 | Roberts et al. | Jan. 17, 1961 |
| 2,972,596 | Newland et al. | Feb. 21, 1961 |
| 2,980,645 | Newland et al. | Apr. 18, 1961 |
| 3,013,003 | Maragliano et al. | Dec. 12, 1961 |
| 3,020,259 | Schulde et al. | Feb. 6, 1962 |